US012012999B2

(12) United States Patent
Binder et al.

(10) Patent No.: US 12,012,999 B2
(45) Date of Patent: Jun. 18, 2024

(54) CLAW-TYPE GEARSHIFT AND METHOD OF SHIFTING A CLAW-TYPE GEARSHIFT

(71) Applicant: Hoerbiger Antriebstechnik Holding GmbH, Schongau (DE)

(72) Inventors: Juergen Binder, Schongau (DE); Werner Fuerguth, Schongau (DE); Andreas Dempfle, Schongau (DE); Wolfgang Voelk, Schongau (DE); Thomas Schnelzer, Schongau (DE); Peter Echtler, Schongau (DE)

(73) Assignee: Hoerbiger Antriebstechnik Holding GmbH, Schongau (DE)

( * ) Notice: Subject to any disclaimer, the term of this patent is extended or adjusted under 35 U.S.C. 154(b) by 0 days.

(21) Appl. No.: 18/050,204

(22) Filed: Oct. 27, 2022

(65) Prior Publication Data

US 2024/0141957 A1    May 2, 2024

(30) Foreign Application Priority Data

Oct. 28, 2021   (DE) .......................... 102021128168.7

(51) Int. Cl.
    *F16D 23/06*    (2006.01)
(52) U.S. Cl.
    CPC ...... *F16D 23/06* (2013.01); *F16D 2023/0618* (2013.01); *F16D 2023/0656* (2013.01)

(58) Field of Classification Search
    CPC ............ F16D 23/06; F16D 2023/0618; F16D 2023/0656; F16D 23/00–148; F16D 23/025; F16D 23/0656–0675
    See application file for complete search history.

(56) References Cited

U.S. PATENT DOCUMENTS

| 10,578,169 B2 * | 3/2020 | Pritchard ................ F16D 23/06 |
| 2003/0074993 A1 * | 4/2003 | Schupp .................... F16D 23/02 192/48.91 |
| 2017/0045095 A1 * | 2/2017 | Back ..................... F16D 23/025 |

* cited by examiner

*Primary Examiner* — Huan Le
(74) *Attorney, Agent, or Firm* — McNees Wallace & Nurick LLC (57) ABSTRACT

In a claw-type gearshift, a blocking ring is arranged axially between a hub body having a sliding sleeve and a clutch body such that it is rotatable between a release position and two locking positions. The blocking ring is adapted to be displaced toward the clutch body until conical friction surfaces on the blocking ring and on the clutch body come into contact. The blocking ring constitutes a form-locking blockade for the sliding sleeve against displacement of the sliding sleeve teeth between the clutch body teeth when an axial shifting force is applied in the non-synchronized state. When the claw clutch is shifted, a difference in speed between the clutch body and the hub body is reduced and the sliding sleeve is deflected in the axial direction toward the speed change gear to be shifted, as a result of which a friction surface of the blocking ring and a mating friction surface of the clutch body come into contact.

12 Claims, 5 Drawing Sheets

CLAW-TYPE GEARSHIFT AND METHOD OF SHIFTING A CLAW-TYPE GEARSHIFT

TECHNICAL FIELD

The disclosure relates to a claw-type gearshift and a method of shifting a claw-type gearshift. The claw-type gearshift is provided in particular for a manual transmission of a vehicle.

BACKGROUND

Claw-type gearshifts, i.e. shiftable claw clutches, have the drawback in motor vehicles that vibrations and noise may occur during engagement of the two coupling elements with each other when there are rotational speed differences.

The object of the disclosure is to provide a claw-type gearshift in which noise generation and wear are reduced.

SUMMARY

A claw-type gearshift includes a sliding sleeve which is adapted to be axially displaced on a hub body and includes an internal toothing having a multitude of sliding sleeve teeth, and a clutch body of a speed change gear, which includes an external toothing which has a multitude of clutch body teeth and is adapted to engage in the internal toothing of the sliding sleeve. Further provided is a blocking ring which has an external toothing having a multitude of blocking ring teeth and is arranged axially between the hub body and the clutch body and which is fixed to the hub body such that it is rotatable in relation to the sliding sleeve by a certain degree in the circumferential direction between a release position and two locking positions, the locking positions being located on either side of the release position in the circumferential direction. Arranged on the hub body are a plurality of thrust pieces which are movable toward the clutch body, and the blocking ring is adapted to be displaced toward the clutch body by the thrust pieces until a friction surface of the blocking ring comes to rest against a mating friction surface of the clutch body. The friction surface on the blocking ring and the mating friction surface on the clutch body have a conical shape. The blocking ring constitutes a form-locking blockade for the sliding sleeve against a displacement of the sliding sleeve teeth between the clutch body teeth when an axial shifting force is applied in the non-synchronized state.

Similar to a synchronizer ring of a known synchronized gearshift, the blocking ring prevents the sliding sleeve from striking the clutch body at a high differential speed. The blocking ring allows the sliding sleeve toothing to engage with the clutch body toothing only after an adaption of the speeds and a rotational speed crossing, which, however, preferably is not effected by the blocking ring itself, but away from the claw-type gearshift. In this way, noise generation and component wear are significantly reduced.

The conical friction surfaces of the blocking ring and the clutch body result in a high frictional force, which can be easily adjusted such that it predominates over frictional forces between the sliding sleeve teeth and the blocking ring teeth in the locking position. This improves a correct switching-over of the blocking ring to the locking position and back to the release position.

In contrast to the known synchronized gearshifts, however, no provision is made for the sliding sleeve to be able to actively return the blocking ring to its release position in order to allow engagement. For this purpose, in particular the blocking ring teeth and the sliding sleeve teeth are formed such and located opposite each other in the locking position such that when a shifting force is applied axially, the sliding sleeve cannot return the blocking ring to the release position. For example, the axial ends of the blocking ring teeth and the sliding sleeve teeth that meet are flattened. As extensive an overlap as possible of the blocking ring teeth and the sliding sleeve teeth in the circumferential direction in the locking position may also contribute to ensuring that, with an axial shifting force applied, the resulting force components in the circumferential direction remain so small that no rotation of the blocking ring back to the release position occurs.

Returning the blocking ring is preferably effected by a rotational speed crossing, that is, a change in direction of the relative rotational speed of the clutch body and the hub body after a zero crossing.

There are two possible scenarios for this. For one thing, the relative rotational speed experiences a change in direction when one component, that is, the clutch body or the hub body, which was previously leading the other, now lags behind it, but both components maintain their previous absolute direction of rotation. For another thing, the relative rotational speed also changes direction when one of the components, that is, the clutch body or the hub body, changes its absolute direction of rotation.

In either case, the friction torque also undergoes a change of direction.

Particularly good locking is achieved when the tooth centers of the blocking ring teeth and the sliding sleeve teeth are opposite each other in each of the locking positions as viewed in the axial direction, that is, when the tooth centers are in the same position in the circumferential direction. The occurrence of lateral force components that might cause a rotation of the blocking ring to the release position can be minimized in this way.

In the release position, the tooth centers of the blocking ring teeth are then accordingly exactly aligned with the tooth gaps of the internal toothing of the sliding sleeve.

In one variant, the axial ends of all of the blocking ring teeth and/or the sliding sleeve teeth are completely flat, i.e. they have no portion that protrudes in the axial direction, and they form a flat, radially oriented surface.

In another variant, very flat axial pointing surfaces are provided at the axial ends of some or all of the blocking ring teeth and/or the sliding sleeve teeth, the pointing surfaces having an opening angle perpendicular to a tooth longitudinal direction in the axial direction that is equal to or smaller than 7 degrees. This angle is in the range of the respective self-locking angle of the material pairing between the blocking ring and the sliding sleeve. These pointing surfaces serve to reduce the frictional forces between the sliding sleeve and the blocking ring in the circumferential direction. At the same time, as high a frictional force as possible is to be maintained in the axial direction.

In this context, the opening angle should be selected to be so small that the frictional forces acting between the sliding sleeve and the blocking ring in the axial direction are greater than the force that is generated by an axial shifting force and seeks to rotate the blocking ring in the circumferential direction.

For example, for a steel-on-steel frictional contact, the coefficient of friction p amounts to 0.1, resulting in a self-locking angle of 5.7 degrees. Compared with the engagement slopes of about 60 degrees conventionally used in synchronizer rings, this means that the pointing surfaces are formed with an extremely small angle.

It has been found that with an opening angle of equal to or smaller than 7 degrees it is made sure for all common material pairings and normal shifting forces that the sliding sleeve is not capable of rotating the blocking ring from its locking position back to the release position.

The non-pointed sliding sleeve teeth or blocking ring teeth are preferably flat.

Since in a claw clutch the sliding sleeve teeth and the clutch body teeth are normally formed without engagement slopes, the required axial installation space for the claw-type gearshift is reduced.

In order to assist the return movement of the blocking ring to a neutral position after the sliding sleeve toothing has engaged with the clutch body toothing, the blocking ring is preferably designed to be so elastic axially that it springs back toward the hub body during the transition to the release position. When returning to the release position, the blocking ring relaxes and moves back toward the hub body due to its elasticity. In the process, the blocking ring teeth preferably move into the gaps between the sliding sleeve teeth, so that further rotation of the blocking ring beyond the release position is prevented.

This high elasticity can be achieved, for example, by a relatively low wall thickness of the blocking ring. This is feasible because the blocking ring does not have to contribute to the speed reduction.

The friction surface of the blocking ring may be made to be shorter than that of conventional synchronizer rings, which is also due to the blocking ring not having to absorb the forces necessary for a speed adaption.

The above-mentioned object is also achieved by a method of shifting a claw-type gearshift, in particular a claw-type gearshift as described above. The claw-type gearshift includes a sliding sleeve adapted to be axially displaced on a hub body, a clutch body of a speed change gear, which is adapted to move into engagement with the sliding sleeve, and a blocking ring arranged axially between the hub body and the clutch body. A difference in speed between the clutch body and the hub body is reduced. A shifting force is applied, and the sliding sleeve is deflected in the axial direction toward the speed change gear to be shifted, as a result of which the friction surface of the blocking ring and the mating friction surface of the clutch body come into contact. Due to the frictional connection with the clutch body, the blocking ring switches over in the circumferential direction to one of two possible locking positions, so that further axial movement of the sliding sleeve is blocked by the external toothing of the blocking ring. Subsequently, the blocking ring switches back to the release position in the circumferential direction when a change in direction of the relative rotational speeds of the clutch body and the hub body occurs, which causes the internal toothing of the sliding sleeve to engage with the external toothing of the clutch body.

Returning the blocking ring to the release position is effected exclusively by the blocking ring being entrained by the clutch body or the hub body when one of these components experiences a rotational speed crossing.

As long as the hub body and the clutch body rotate in the same direction without a rotational speed crossing, the blocking ring preferably blocks an axial further movement of the sliding sleeve irrespective of the shifting force acting.

If a tooth-on-tooth position occurs at the first contact between the sliding sleeve teeth and the clutch body teeth, a relative rotation between the hub body and the clutch body, which allows the internal toothing of the sliding sleeve to engage with the external toothing of the clutch body, is advantageously achieved by a speed difference between the hub body and the clutch body that builds up after rotational speed crossing. Normally, a small speed difference necessarily arises after only a short time following rotational speed crossing. Therefore, the clutch body and the sliding sleeve will automatically move to a tooth-on-gap position. At this point in time, the blocking ring is already in its release position and no longer blocks the sliding sleeve. It is also of advantage that the speed adaption need not be designed such that it results in completely identical speeds of the hub body and the clutch body.

In particular, the adaption of the speeds of the hub body and the clutch body is not effected by the blocking ring, but by means of a device that is separate from the blocking ring and can be implemented at a suitable location in the vehicle away from the claw-type gearshift. The speed adaption is preferably initiated before the shifting force is applied and the sliding sleeve is moved, so that the blocking ring does not come into contact with the clutch body until the speeds have already been largely adapted. The blocking ring therefore only needs to withstand very small speed differences, so it can be constructed significantly thinner than a conventional synchronizer ring, which saves both axial installation space and material.

If the blocking ring has only a relatively low material thickness, it can support itself against an end face of the clutch body when it is axially acted upon by the sliding sleeve. Thus, the clutch body absorbs part of the axial force, and it is not necessary for the blocking ring to be overly stable. In addition, a further advantage is that the sliding sleeve is locked very close to the toothing to be coupled. This means that after unlocking, the sliding sleeve is moved only a very short axial distance up to the clutch toothing. This reduces the impulse when the toothings meet, and noises and the mechanical load on the toothing are reduced.

The flexibility of the blocking ring may be made use of to assist the restoring of the blocking ring to its neutral position. For example, provision is made that the conical friction surface widens radially when the blocking ring is acted upon axially by the sliding sleeve and the conical friction surface comes into contact with the clutch body. In the process, the blocking ring is pushed a little further onto the clutch body, producing a preload in the axial direction back toward the hub body.

This may be utilized in particular when the blocking ring relaxes and springs back to its axial neutral position when it has rotated back to its release position, with the blocking ring teeth moving between the sliding sleeve teeth. In this way, further rotation of the blocking ring to the opposite locking position is effectively prevented.

DETAILED DESCRIPTION

For the sake of clarity, where components are shown more than once in the drawings, not all of them are provided with reference numbers.

The claw-type gearshift 10 illustrated in the Figures, which is designed here for a manual transmission of a motor vehicle, serves to optionally connect a rotatable shaft to a speed change gear (not shown) for joint rotation therewith. The shaft carries a hub body 12, which is connected to said shaft for joint rotation therewith, while a clutch body 14 is attached to the speed change gear for permanent joint rotation therewith.

The hub body 12 includes an external toothing 16 that is permanently in engagement with an internal toothing 18 of a sliding sleeve 20 that surrounds the hub body 12 in the circumferential direction U.

The sliding sleeve 20 is displaceable in the axial direction A by a certain degree to either side of the hub body 12, with the toothings 16, 18 remaining in engagement with each other at all times. The sliding sleeve 20 is axially displaceable so far that the internal toothing 18 comes to engage in an external toothing 22 of the clutch body 14.

Figure 1:
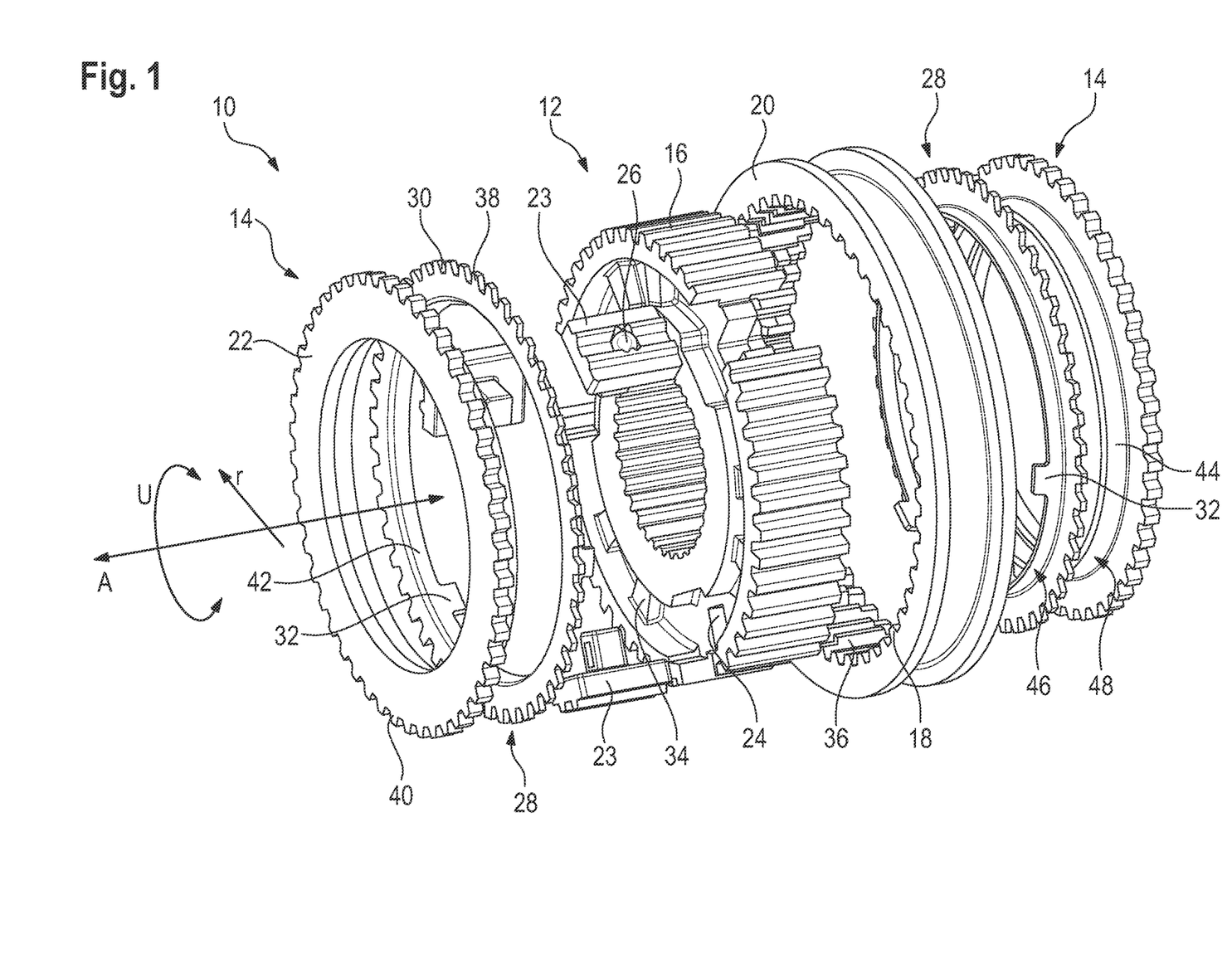
FIG. 1 shows a schematic exploded view of a claw-type gearshift according to the disclosure for carrying out a method according to the disclosure.

As is illustrated in FIG. 1, as a rule, two speed change gears, each with a clutch body 14, are arranged on either side of the hub body 12 so that two gears can be shifted by the axial movement of the sliding sleeve 20.

In a circumferential surface of the hub body 12, a plurality of thrust pieces 23, in this case three, are arranged so as to be evenly distributed over the circumference and are each accommodated in a radial retainer 24 and are movable to a certain degree in both directions in the axial direction A. The thrust pieces 23 are positioned in the circumferential direction U. Each of the ball-and-spring thrust pieces 23 has a ball 26 accommodated therein, which can be pressed into the thrust piece 23 in the radial direction r against a spring tension. The thrust pieces 23 cooperate with the sliding sleeve 20 in a known manner. In a neutral position, the balls 26 engage in a latching groove 27 on the inside of the sliding sleeve 20, so that the thrust pieces 23 are deflected axially when the sliding sleeve 20 is displaced (see, e.g., FIGS. 4 and 6). When the internal toothing 18 of the sliding sleeve 20 engages with the external toothing 22 of the clutch body 14, the balls 26 are pressed into the respective thrust piece 23 so that the sliding sleeve 20 can slide thereover (see FIG. 8).

In the axial direction A, a respective blocking ring 28 having an external toothing 30 is arranged between the clutch body 14 and the hub body 12.

The blocking ring 28 has a plurality of axially projecting coupling tabs 32 which are distributed over its circumference and which are in permanent engagement with corresponding coupling grooves 34 in a side surface of the hub body 12. The coupling grooves 34 are made to be so wide in the circumferential direction U that the coupling tabs 32 and thus the blocking ring 28 can rotate by a certain angular measure in both directions to two locking positions in relation to a central release position. In each of the locking positions, the coupling tabs 32 rest against a lateral circumferential edge of the coupling grooves 34.

The toothings 18, 22, 30 of the sliding sleeve 20, the clutch body 14 and the blocking ring 28 all have dimensions that are matched to each other, so that the sliding sleeve teeth 36 can engage between the blocking ring teeth 38 and the clutch body teeth 40.

Here, the blocking ring teeth 38 have roughly the same dimensions in the circumferential direction U as the clutch body teeth 40; in the release position, the tooth gaps of the external toothing 30 of the blocking ring 28 and the external toothing 22 of the clutch body 14 are in alignment, and in each of the locking positions, the blocking ring teeth 38 cover the gaps between the clutch body teeth 40, thus blocking the axial movement of the sliding sleeve 20.

Figure 7:
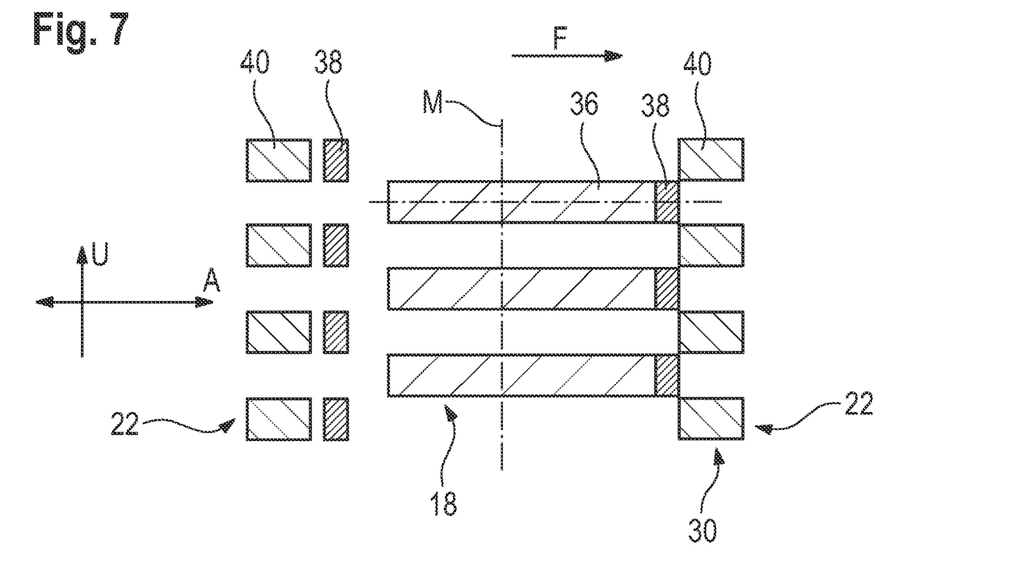

As shown in FIG. 7, the blocking ring teeth 38 and the sliding sleeve teeth 36 are in the same position in the locking positions in the circumferential direction U. The shifting force F therefore acts centrally on the blocking ring teeth 38.

Figure 3:
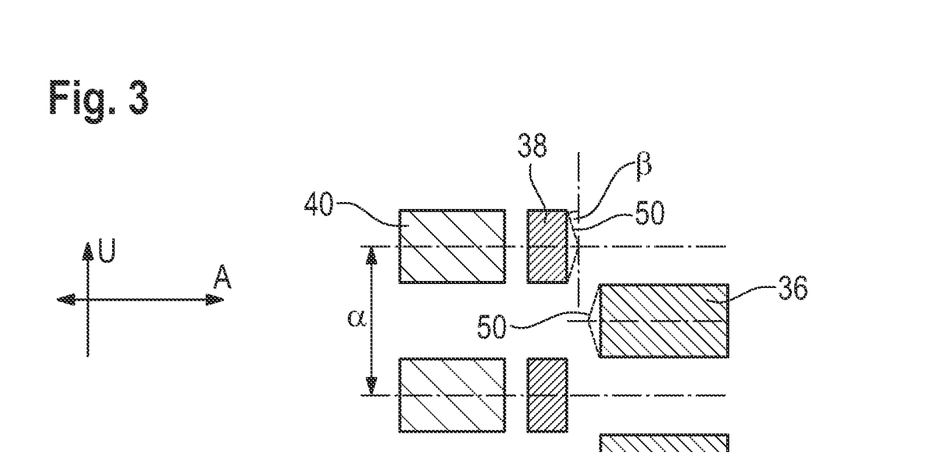
FIG. 3 shows a schematic illustration of a variant of the shape of the blocking ring teeth and the sliding sleeve teeth of the claw-type gearshift of FIG. 1.

The angle α between the two locking positions comprises one tooth spacing (from tooth center to tooth center) of the external toothing 22 of the clutch body 14, and accordingly of the external toothing 30 of the blocking ring 28 (indicated in FIG. 3). The coupling tabs 32 in the coupling grooves 34 have this range of movement of one tooth spacing.

In this example, all of the blocking ring teeth 38 are formed to be axially flat.

To reduce the friction between the blocking ring 28 and the sliding sleeve 20, it would, however, be possible to provide axial pointing surfaces 50 having a very small opening angle β in the range of the respective self-locking angle on some or all blocking ring teeth 38 and/or sliding sleeve teeth 36. Such pointing surfaces 50 are outlined in FIG. 3.

The opening angle β here is always selected such that the frictional forces between the sliding sleeve 20 and the blocking ring 28 are sufficiently large compared with a force that is directed in the circumferential direction U and generated by the axial shifting force F applied, in order to prevent the sliding sleeve 20 from rotating the blocking ring 28 to the release position even in the case of high shifting forces.

For example, for a steel-on-steel frictional contact, the coefficient of friction p is 0.1, resulting in a self-locking angle of 5.7 degrees.

The axial pointing surfaces 50 here have, e.g., an opening angle β perpendicular to a tooth longitudinal direction that coincides with the axial direction A, the angle being equal to or smaller than 7 degrees.

The axial ends of the clutch body teeth 40 are always flat here.

The sliding sleeve 20 cannot actively rotate the blocking ring 28 back to its release position. When the blocking ring 28 is in one of the locking positions, the sliding sleeve 20 is prevented from moving axially further toward the associated clutch body 14, irrespective of the axial shifting force applied.

The blocking ring teeth 38 and also the sliding sleeve teeth 36 as well as the clutch body teeth 40 are formed entirely without engagement slopes.

On its side facing the clutch body 14, the blocking ring 28 is provided with a friction surface 42, which is adapted to cooperate with a mating friction surface 44 on the clutch body 14.

In the example shown here, the friction surface 42 and the mating friction surface 44 have a cone shape. The friction surface 42 is arranged on a radially inner cone 46 of the blocking ring 28, while the mating friction surface 44 is located on a conical axial projection 48 of the clutch body 14.

Generally, one or both of the friction surfaces 42, 44 may be formed only by the surface of the material of the blocking ring 28 or of the clutch body 14, respectively, if necessary with a suitable structuring, for example a grooved structure. In addition, one or both friction surface(s) 42, 44 may also be provided with a friction-enhancing and/or wear-reducing coating.

The blocking ring 28 is markedly thinner than a conventional synchronizer ring and is so flexible and elastic that it can deform elastically to a certain extent both in the axial direction A and in the radial direction r.

Referring to FIGS. 4 to 9, the operation of the claw-type gearshift 10 will now be described.

Figure 4:
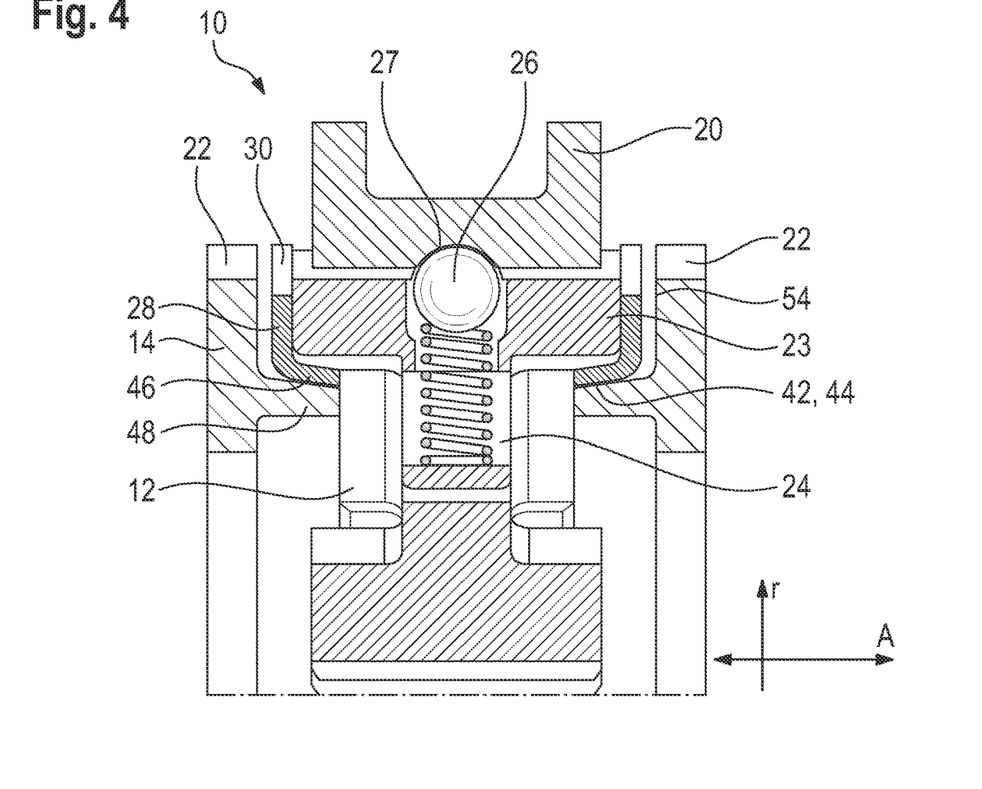
FIGS. 4 and 5 show schematic views of the claw-type gearshift from FIG. 1 in a neutral position, with the blocking ring in its release position.
Figure 5:
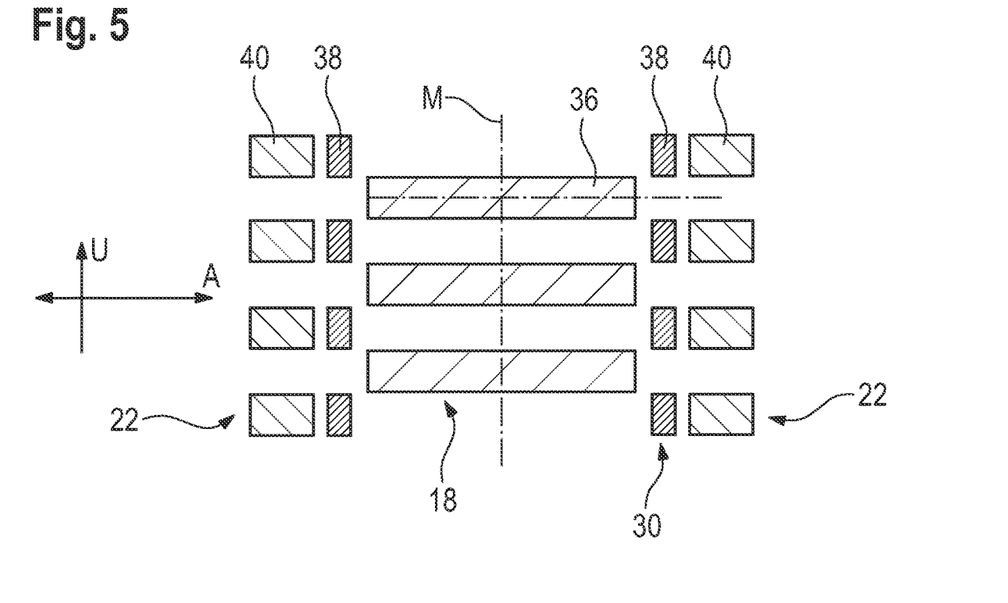

FIGS. 4 and 5 show the claw-type gearshift 10 in a neutral position, in which the blocking ring 28 is in its release position. The sliding sleeve 20, the blocking ring 28 and the clutch body 14 are axially spaced apart from each other and do not contact each other. The blocking ring 28 has a small axial clearance with respect to both the sliding sleeve 20 and the clutch body 14.

The sliding sleeve 20 is located centrally between the two clutch bodies 14, which is illustrated by the dashed centerline M in FIG. 5.

As shown in FIG. 5, the toothings 22, 30 of the blocking ring 28 and the clutch body 10 are congruent, and the sliding sleeve teeth 36 lie in the gaps of the toothings 22, 30 in the circumferential direction U.

Figure 2:
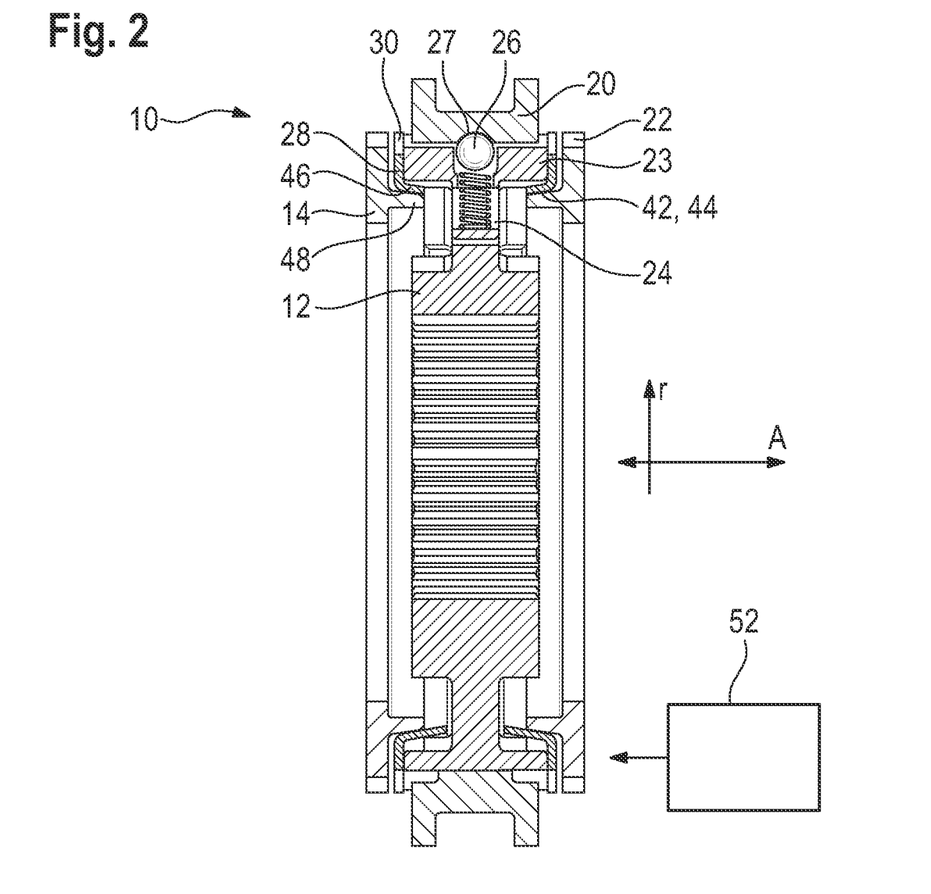
FIG. 2 shows a schematic partly sectional view of the claw-type gearshift of FIG. 1.

For shifting a gear, first the speeds of the hub body 12 and of the clutch body 14 which is to be coupled to the sliding sleeve 20 are largely approximated by a device 52 for speed adaption (indicated in FIG. 2). The device 52 may, for example, be coupled to an electric motor of the vehicle and does not comprise the blocking ring 28.

Figure 6:
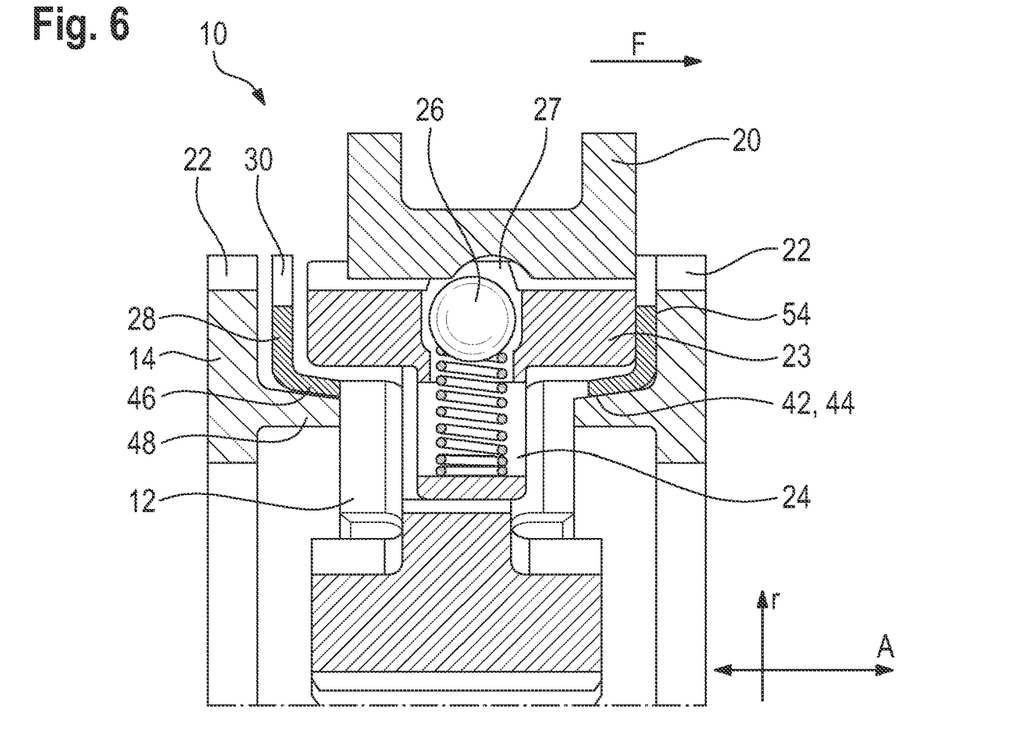
FIGS. 6 and 7 show schematic views of the claw-type gearshift from FIG. 1 in a locked position, with the blocking ring in one of its locking positions.

Only when this substantial speed adaption has been effected is an axial shifting force F applied, to the right in the Figures. The sliding sleeve 20 is displaced a short distance in the axial direction A, entraining the balls 26 of the thrust pieces 23 in the axial direction A, which in turn axially deflects the thrust pieces 23. The thrust pieces 23 act axially on the blocking ring 28, causing the friction surface 42 to come into contact with the mating friction surface 44 (see FIG. 6). This frictional contact causes the clutch body 14 to entrain the blocking ring 28 in the circumferential direction U, so that the latter switches over from its release position to one of the locking positions. This is shown in FIGS. 6 and 7. The blocking ring teeth 38 are now located in front of the gaps in the external toothing 22 of the clutch body 14 and centrally in front of the sliding sleeve teeth 36 in the circumferential direction U.

The blocking ring 28 does not take over the function of speed adaption between the hub body 12 and the clutch body 14. This is performed practically exclusively by the device 52. The blocking ring 28 is moved to one of its locking positions only by the remaining residual difference in speed.

The claw-type gearshift 10 is now in a locked position, in which the sliding sleeve 20 cannot move any further in the axial direction A toward the clutch body 14.

The amount of frictional force between the friction surface 42 and the mating friction surface 44 here is selected to be higher than the frictional force that now develops between the sliding sleeve 20 and the blocking ring 28. This can be ensured, for example, by the pointing surfaces 50 already described above (see FIG. 3). Where pointing surfaces 50 are provided, the surface of contact between the sliding sleeve toothing 18 and the blocking ring 28 is reduced to line contacts, which significantly reduces the frictional force in the circumferential direction U, which is not desired at this location. This prevents the sliding sleeve 20 from possibly entraining the blocking ring 28 in the circumferential direction U, since the frictional force between the blocking ring 28 and the clutch body 14 always predominates.

The blocking ring 28 is so elastically flexible in the axial direction A here that it is supported against an end face 54 of the clutch body 14 when it is acted upon with the force F by the sliding sleeve 20 (see FIG. 6).

Moreover, the blocking ring 28 is so elastically flexible in the radial direction r here that the cone 46 widens slightly and is pushed further onto the cone 48 of the clutch body 14.

The device 52 further acts to adapt the speeds of the hub body 12 and the clutch body 14. In the process, after a short period of time, a rotational speed crossing, that is, a change in direction of the relative rotational speeds of the hub body 12 and the clutch body 14 will occur.

Figure 8:
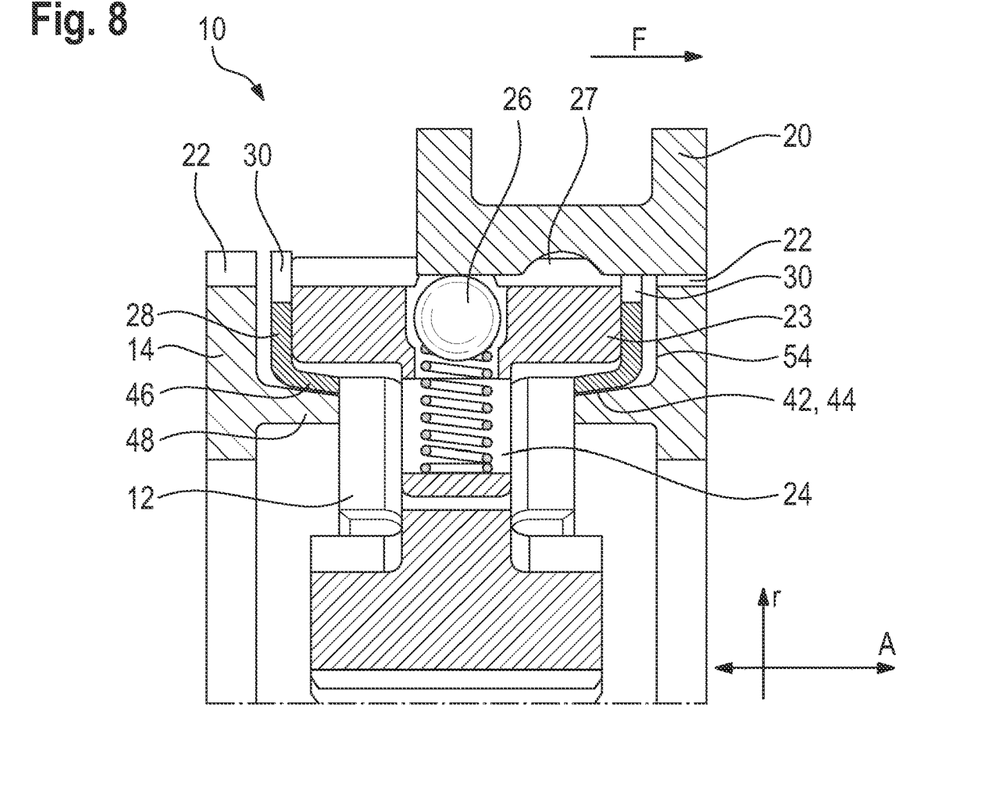
FIGS. 8 and 9 show schematic views of the claw-type gearshift from FIG. 1 in a docking position, in which the sliding sleeve is in engagement with the clutch body.
Figure 9:
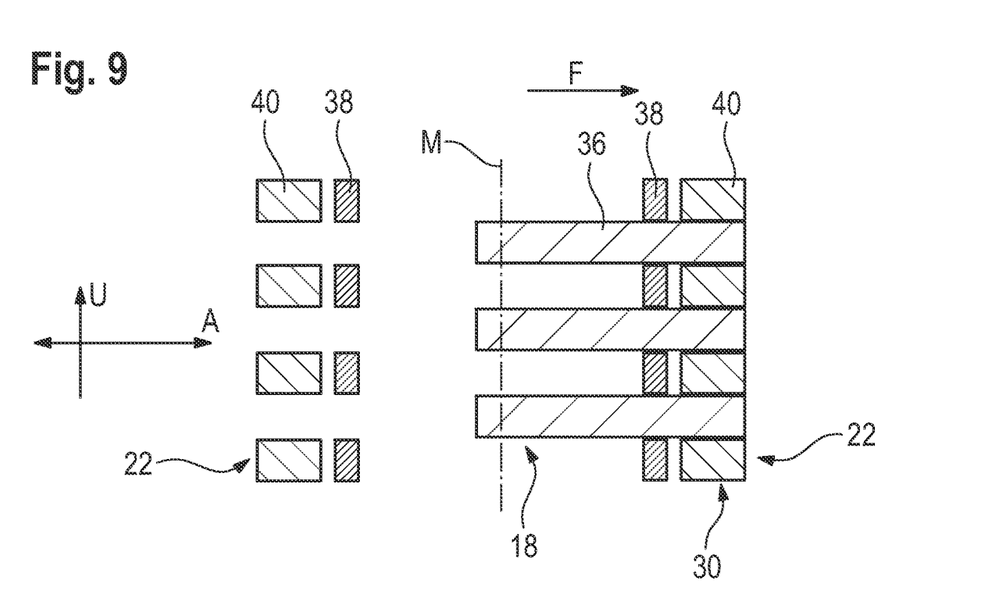

This change in direction of the relative rotational speed causes the blocking ring 28 to rotate back to the release position in the circumferential direction U, resulting in the docking position shown in FIGS. 8 and 9.

The sliding sleeve teeth 36 now meet the gaps between the blocking ring teeth 38, so that the axial force acting on the blocking ring 28 decreases. The blocking ring 28 relaxes and springs back in the axial direction A to its neutral position toward the sliding sleeve 20.

This movement is assisted by the cone shape of the friction surface 42 and the mating friction surface 44.

Since at this point in time the sliding sleeve teeth 36 are directed toward the gaps in the blocking ring toothing 30, the blocking ring teeth 38 slide between the sliding sleeve teeth 36. This prevents the blocking ring 28 from switching over beyond the release position to the opposite locking position.

The sliding sleeve 20 can now be moved further in the axial direction A, with its internal toothing 18 engaging with the external toothing 22 of the clutch body 14.

The rotational speed crossing is also always accompanied by the build-up of a new, small speed differential between the hub body 12 and the clutch body 14. This ensures that the sliding sleeve 20 and the clutch body 14 automatically move to a position in which the sliding sleeve teeth 36 meet the gaps in the external toothing 22 of the clutch body 14, even if there should be a tooth-on-tooth position at the first contact.

The blocking ring 28 is not involved in this process.

With its compact axial type of construction, the claw-type gearshift 10 allows a low-noise and low-wear shifting, since the movement of the sliding sleeve 20 is blocked until a rotational speed crossing has taken place. The blocking ring 28 used is not employed for rotational speed adaption here and may therefore be manufactured to have a low material thickness.

The invention claimed is:

1. A claw-type gearshift, comprising:
a sliding sleeve which is adapted to be axially displaced on a hub body and includes an internal toothing having a multitude of sliding sleeve teeth, and a clutch body of a speed change gear, which includes an external toothing which has a multitude of clutch body teeth and is adapted to engage in the internal toothing of the sliding sleeve, and
a blocking ring which has an external toothing having a multitude of blocking ring teeth and is arranged axially between the hub body and the clutch body and which is fixed to the hub body such that it is rotatable in relation to the sliding sleeve by a certain degree in a circumferential direction between a release position and two locking positions, the locking positions being located on either side of the release position in the circumferential direction, wherein arranged on the hub body are a plurality of thrust pieces which are movable toward the clutch body, and the blocking ring is adapted to be displaced by the thrust pieces toward the clutch body until a friction surface of the blocking ring comes to rest against a mating friction surface of the clutch body, wherein the friction surface on the blocking ring and the mating friction surface on the clutch body have a conical shape, and wherein the blocking ring constitutes a form-locking blockade for the sliding sleeve against a displacement of the sliding sleeve teeth between the clutch body teeth when an axial shifting force is applied in a non-synchronized state, and wherein the blocking ring teeth and the sliding sleeve teeth are formed such and located opposite each other in the locking position such that when the axial shifting force is applied, the sliding sleeve cannot return the blocking ring to the release position.

2. The claw-type gearshift according to claim 1, wherein the tooth centers of the blocking ring teeth and the sliding sleeve teeth are opposite each other in each of the locking positions as viewed in an axial direction.

3. The claw-type gearshift according to claim 1, wherein axial ends of the blocking ring teeth and/or the sliding sleeve teeth are either made to be axially flat or to have axial pointing surfaces that have an opening angle perpendicular to a tooth longitudinal direction that is equal to or smaller than 7 degrees, wherein the opening angle lying in a range of a respective self-locking angle of a material pairing is between the blocking ring and the sliding sleeve.

4. The claw-type gearshift according to claim 1, wherein the sliding sleeve teeth and the clutch body teeth are formed without engagement slopes.

5. The claw-type gearshift according to claim 1, wherein the claw-type gearshift is provided for a manual transmission.

6. A method of shifting a claw-type gearshift having a sliding sleeve adapted to be axially displaced on a hub body, a clutch body of a speed change gear, which is adapted to move into engagement with the sliding sleeve, and a blocking ring arranged axially between the hub body and the clutch body, the blocking ring having an external toothing with blocking ring teeth and the sliding sleeve having an internal toothing with a multitude of sliding sleeve teeth, the method comprising:

firstly, reducing a difference in speed between the clutch body and the hub body;

secondly, applying an axial shifting force and deflecting the sliding sleeve in the axial direction toward the speed change gear to be shifted, as a result of which a friction surface of the blocking ring and a mating friction surface of the clutch body come into contact;

switching the blocking ring over in a circumferential direction to one of two possible locking positions by the frictional connection with the clutch body, so that a further axial movement of the sliding sleeve is blocked by the external toothing of the blocking ring;

switching the blocking ring over in the circumferential direction to a release position when a change in direction of the relative rotational speeds of the clutch body and the hub body occurs, wherein the blocking ring teeth and the sliding sleeve teeth are formed such and located opposite each other in the locking position such that when the axial shifting force is applied, the sliding sleeve cannot return the blocking ring to the release position; and engaging the internal toothing of the sliding sleeve with an external toothing of the clutch body.

7. The method according to claim 6, wherein the blocking ring blocks an axial further movement of the sliding sleeve irrespective of the shifting force acting.

8. The method according to claim 6, wherein a relative rotation between the hub body and the clutch body, which allows the internal toothing of the sliding sleeve to engage with the external toothing of the clutch body, is achieved by a speed difference between the hub body and the clutch body that builds up after the change in direction of the relative rotational speeds of the clutch body and the hub body occurs.

9. The method according to claim 6, wherein the adaption of the speeds of the hub body and the clutch body is effected by a device that is separate from the blocking ring and thrust pieces arranged on the hub body.

10. The method according to claim 6, wherein the friction surface of the blocking ring is conical and widens radially when the blocking ring is axially acted upon by the sliding sleeve and the conical friction surface comes into contact with the clutch body, and wherein the blocking ring relaxes and springs back to its axial neutral position when it rotates back to its release position, with the blocking ring teeth moving between the sliding sleeve teeth.

11. The method according to claim 6, wherein the external toothing of the blocking ring is arranged axially between the hub body and the clutch body, the locking positions being located on either side of the release position in the circumferential direction, wherein arranged on the hub body are a plurality of thrust pieces which are movable toward the clutch body, and the blocking ring is adapted to be displaced by the thrust pieces toward the clutch body until the friction surface of the blocking ring comes to rest against the mating friction surface of the clutch body, wherein the friction surface on the blocking ring and the mating friction surface on the clutch body have a conical shape, and wherein the blocking ring constitutes a form-locking blockade for the sliding sleeve against a displacement of the sliding sleeve teeth between the clutch body teeth when the axial shifting force is applied in a non-synchronized state.

12. A method of shifting a claw-type gearshift having a sliding sleeve adapted to be axially displaced on a hub body, a clutch body of a speed change gear, which is adapted to move into engagement with the sliding sleeve, and a blocking ring arranged axially between the hub body and the clutch body, the method comprising:

reducing a difference in speed between the clutch body and the hub body;

applying an axial shifting force and deflecting the sliding sleeve in the axial direction toward the speed change gear to be shifted, as a result of which a friction surface of the blocking ring and a mating friction surface of the clutch body come into contact;

switching the blocking ring over in a circumferential direction to one of two possible locking positions by the frictional connection with the clutch body, so that a further axial movement of the sliding sleeve is blocked by an external toothing of the blocking ring;

switching the blocking ring over in the circumferential direction to a release position when a change in direction of the relative rotational speeds of the clutch body and the hub body occurs; and engaging an internal toothing of the sliding sleeve with an external toothing of the clutch body, wherein the blocking ring is supported against an end face of the clutch body when the blocking ring is axially acted upon by the sliding sleeve.

\* \* \* \* \*